US009699382B2

United States Patent
Kim et al.

(10) Patent No.: US 9,699,382 B2
(45) Date of Patent: Jul. 4, 2017

(54) OPTICAL IMAGE STABILIZER AND METHOD OF DECREASING POWER CONSUMPTION

(71) Applicant: SAMSUNG ELECTRO-MECHANICS CO., LTD., Suwon-si (KR)

(72) Inventors: Min Gyu Kim, Suwon-si (KR); Sam Ki Jung, Suwon-si (KR); Dae Sik Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 73 days.

(21) Appl. No.: 14/949,938

(22) Filed: Nov. 24, 2015

(65) Prior Publication Data

US 2016/0173783 A1    Jun. 16, 2016

(30) Foreign Application Priority Data

Dec. 10, 2014    (KR) ........................ 10-2014-0177746

(51) Int. Cl.
*H04N 5/232*    (2006.01)

(52) U.S. Cl.
CPC ..... *H04N 5/23287* (2013.01); *H04N 5/23206* (2013.01); *H04N 5/23241* (2013.01); *H04N 5/23258* (2013.01)

(58) Field of Classification Search
CPC ......... H04N 1/00885–1/0904; H04N 5/23241; H04N 5/2329–5/23287; G03B 5/00–5/08; G03B 2205/00–2205/0038; G02B 27/64; G02B 27/646
See application file for complete search history.

(56) References Cited

U.S. PATENT DOCUMENTS

| 5,701,521 A | 12/1997 | Ohishi et al. | |
|---|---|---|---|
| 2001/0033331 A1* | 10/2001 | Eto | H04N 5/232 348/208.99 |
| 2005/0168586 A1* | 8/2005 | Tsubusaki | H04N 1/2112 348/208.99 |
| 2011/0122268 A1 | 5/2011 | Okamoto et al. | |
| 2012/0026348 A1* | 2/2012 | Yun | G03B 7/26 348/208.4 |

FOREIGN PATENT DOCUMENTS

| JP | 7-294982 A | 11/1995 |
|---|---|---|
| WO | WO 2010/004764 A1 | 1/2010 |

* cited by examiner

*Primary Examiner* — Paul Berardesca
(74) *Attorney, Agent, or Firm* — NSIP Law (57) ABSTRACT

An optical image stabilizer includes a motion sensor configured to sense a movement of a camera, and a controller configured to move a lens module based on the movement of the camera. The optical image stabilizer enters a standby mode based on an OIS turn-off command being received from a host, in response to the camera being turned off or a camera function being executed in a background during a stage in which an optical image stabilization (OIS) operation is performed. A portion of the functional blocks of the optical image stabilizer is turned off when a lens control is not performed even when the optical image stabilizer is being operated, thereby decreasing power consumption. Functional blocks as small as possible may be operated when the optical image stabilizer is not operated to decrease power consumption in a smartphone or a camera in which the optical image stabilizer is embedded.

14 Claims, 5 Drawing Sheets

OPTICAL IMAGE STABILIZER AND METHOD OF DECREASING POWER CONSUMPTION

CROSS-REFERENCE TO RELATED APPLICATION(S)

This application claims the priority and benefit under 35 USC §119(a) of Korean Patent Application No. 10-2014-0177746 filed on Dec. 10, 2014, with the Korean Intellectual Property Office, the entire disclosure of which is incorporated herein by reference for all purposes.

BACKGROUND

1. Field

The following description relates to an optical image stabilizer and a method of decreasing power consumption.

2. Description of Related Art

An optical image stabilization (hereinafter referred to as "OIS") is directed to obtain a clear image regardless of an interference, such as, for example, a shutter, a stop, or a shaking, even in a situation in which a camera is minutely shaken. When a hand tremor occurs, a gyro sensor senses how much the camera moves, and an actuator is driven by a distance at which the camera moves to move a lens module, thereby correcting the hand tremor.

When the OIS is operated a camera or a Smartphone, power consumption increases causing a rise in consumption of battery power.

U.S. Pat. No. 5,701,521 A discloses a photographic device having a vibration control function, having a low current consumption mode of stopping processing of an embedded program and suppressing current consumption and a normal operation mode of performing the processing of the embedded program, and having a vibration compensation function of changing a one-chip microcomputer from the normal operation mode into the low current consumption mode when a photographic operation has ended.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an optical image stabilizer including a motion sensor configured to sense a movement of a camera, and a controller configured to move a lens module based on the movement of the camera, wherein the optical image stabilizer enters a standby mode based on an OIS turn-off command being received from a host, in response to the camera being turned off or a camera function being executed in a background during a stage in which an optical image stabilization (OIS) operation is performed.

The optical image stabilizer may include a communicator configured to communicate with the host, and a power manager configured to control a power supply of the optical image stabilizer and to turn on only the communications module in the standby mode.

The power manager may be further configured to back up an operation frequency and power related set values before the optical image stabilizer enters the standby mode, and to decrease the operation frequency to be sufficient for operation of the communicator.

The power manager may be further configured to restore the operation frequency and the power related set values and to allow the controller to perform the OIS operation depending on the OIS operation control period, in response to the communicator receiving an OIS turn-on command from the host when the optical image stabilizer is in the standby mode.

The optical image stabilizer may be maintained in an idle mode in the OIS operation control period from a point in time when controlling of an actuator moving the lens module ends to a point in time when a next OIS operation control period starts.

The optical image stabilizer may including a power manager and a memory, wherein the power manager is configured to stop supply of clocks to the controller and the memory during a stage in which the optical image stabilizer is in the idle mode.

The power manager may be further configured to restarts the supply of the clocks to the control unit and the memory in response to receiving an interrupt signal informing a start of the next OIS operation control period from a timer when the optical image stabilizer is in the idle mode, the OIS operation control period comprises a stage in which an output signal of a hall sensor is converted into digital data, a motion sensor data calculating stage, a proportional-integral-differential (PID) data calculating stage, an actuator control stage, and an idle stage.

In another general aspect, there is provided a method of decreasing power consumption of an optical image stabilizer, the method including running the optical image stabilizer in a run mode to perform an OIS operation depending on an OIS operation control period, in response to an OIS turn-on command being received from a host, and allowing the optical image stabilizer to enter a standby mode, in response to a camera being turned off or a camera function being executed in a background when the optical image stabilizer is in the run mode, and an OIS turn-off command is received from the host.

Only a communications module used for communications with the host may be turned on in the standby mode.

An operation frequency and power related set values may be backed up and the operation frequency may be decreased to be sufficient for the operation of the communications module, before the optical image stabilizer enters the standby mode.

The running of the optical image stabilizer in the run mode may include restoring the operation frequency and the power related set values and performing the OIS operation depending on the OIS operation control period, in response to the communications module receiving the OIS turn-on command when the optical image stabilizer is in the standby mode.

The running of the optical image stabilizer in the run mode may include maintaining the optical image stabilizer in an idle mode from a point in time at which controlling of an actuator moving a lens module ends to a point in time at which a next OIS operation control period starts.

The method may including stopping a supply of clocks to a control unit and a memory during a stage in which the optical image stabilizer is in the idle mode.

The method may including restarting the supply of the clocks to the control unit and the memory, in response to an interrupt signal informing a start of the next OIS operation control period being received from a timer during the stage in which the optical image stabilizer is in the idle mode.

The OIS operation control period may comprises a stage in which an output signal of a hall sensor is converted into digital data, a motion sensor data calculating stage, a PID data calculating stage, an actuator control stage, and an idle stage.

The method may including allowing the optical image stabilizer to enter the standby mode, in response to a standby turn-on command being received from the host during a stage in which the optical image stabilizer is in a ready mode, allowing the optical image stabilizer to enter the ready mode, in response to a standby turn-off command being received from the host during a stage in which the optical image stabilizer is in the standby mode, and allowing the optical image stabilizer to enter the run mode, in response to the OIS turn-on command being received from the host during a stage in which the optical image stabilizer is in the ready mode.

In another general aspect, there is provided an optical image stabilizer including a communication module communicating with a host, a motion sensor configured to sense a movement of an optical lens, and a controller configured to adjust an amount of current flowing to a motor, the motor being configured to move the optical lens based on the current, wherein the optical image stabilizer is maintained in an idle mode during portions of an optical image stabilization (OIS) operation from a first time when the motor stops moving the optical lens to a second time when the communication module generates an interrupt signal to start another OIS operation.

The communication module may generate the interrupt signal, in response to receiving data from the host.

The optical image stabilizer may include a power manager configured to control a power supply of the optical image stabilizer, and wherein the power manager may be configured to lower an operation frequency required for an operation of the OIS to be sufficient for the communications module to operate from the first time to the second time.

According to another aspect, an optical image stabilizer may include a gyro sensor sensing shaking of a camera, and a control unit moving a lens module based on the shaking of the camera sensed by the gyro sensor. When the camera is turned off or a camera function is executed as a background during a stage in which an optical image stabilization (OIS) operation is performed depending on an OIS operation control period, such that an OIS turn-off command is received from a host, the optical image stabilizer may enter a standby mode.

Other features and aspects will be apparent from the following detailed description, the drawings, and the claims.

Throughout the drawings and the detailed description, unless otherwise described or provided, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations is described as an example; the sequence of operations is not limited to that set forth herein and may be changed as is known in the art, with the exception of steps and/or operations that necessarily occur in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure is thorough, complete, and conveys the full scope of the disclosure to one of ordinary skill in the art.

Figure 1:
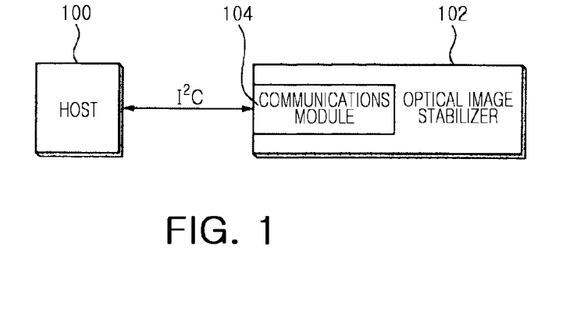
FIG. 1 is a diagram illustrating an example of a relationship between an optical image stabilizer and a host.
Figure 2:
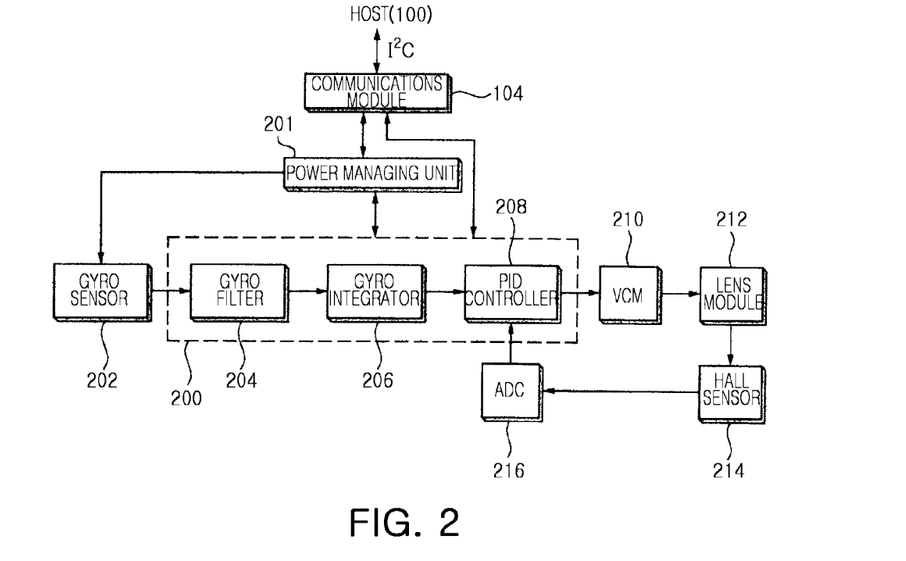
FIG. 2 is a diagram illustrating an example of the optical image stabilizer.
Figure 3:
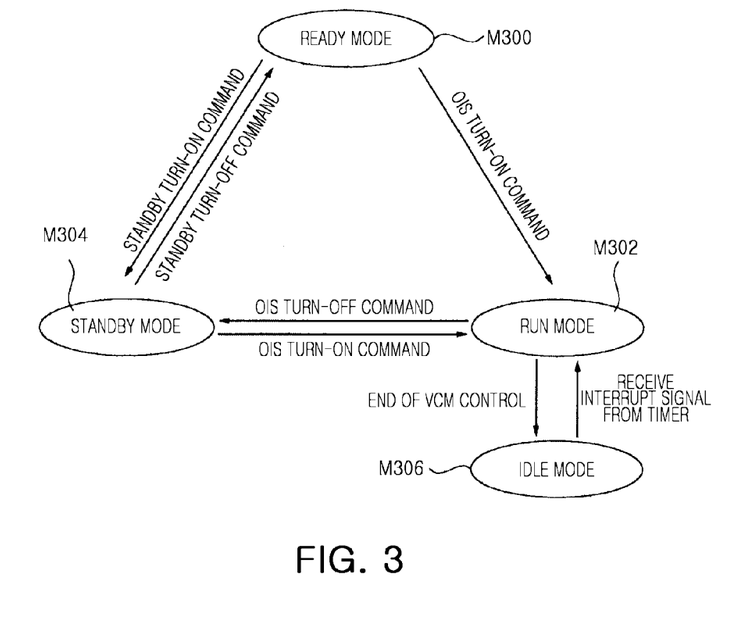
FIG. 3 is a diagram illustrating an example of an operation mode of the optical image stabilizer depending on a method of decreasing power consumption of an optical image stabilizer.

FIG. 1 is a diagram illustrating an example of a relationship between an optical image stabilizer and a host. FIG. 2 is a diagram illustrating an example of the optical image stabilizer. FIG. 3 is a diagram illustrating an example of an operation mode of the optical image stabilizer depending on a method of decreasing power consumption of an optical image stabilizer.

An example of an optical image stabilizer 102 as illustrated in FIG. 1 may include a communications module 104 communicating with a host 100.

The optical image stabilizer 102 illustrated in FIG. 1 may be embedded in a camera or a portable device in which the camera is mounted. As a non-exhaustive illustration only, a portable device described herein may refer to mobile devices such as, for example, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths or the like), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, or any other consumer electronics/information technology (CE/IT) device, or any other device capable of wireless communication or network communication consistent with that disclosed herein. For convenience of description, in FIG. 1, it is assumed that the optical image stabilizer is embedded in a smartphone.

FIG. 1 illustrates a relationship between the optical image stabilizer 102 and the host 100 controlling an operation of the optical image stabilizer 102, generally, an application processor (AP) in a smartphone, in an example where the optical image stabilizer 102 is embedded in a smartphone.

The host 100 may transmit a command to the optical image stabilizer 102 through an inter-integrated circuit (I²C) interface or control an operation of the optical image stabilizer 102 depending on an internal state of the optical image stabilizer 102. The communications module 104 included in the optical image stabilizer 102 may communicate with the host 100.

The optical image stabilizer according to an example illustrated in FIG. 2 may include a central processing unit (CPU) 200, a power managing unit 201, a gyro sensor 202, a voice coil motor (VCM) 210, a hall sensor 214, the communications module 104, and an analog to digital converter 216.

The CPU 200 may be a control unit controlling an operation of the optical image stabilizer, and may include a gyro filter 204, a gyro integrator 206, and a proportional-integral-differential (PID) controller 208. The power managing unit 201 may control power of the optical image stabilizer.

The gyro sensor 202 may be a motion sensor that senses a shaking or movement of a camera (not illustrated). The gyro sensor 202 may sense the shaking of the camera to output an angular velocity. The gyro filter 204 may remove a direct current (DC) offset from the angular velocity output from the gyro sensor 202, and an angular velocity may be multiplied by a time by the gyro integrator 206 to calculate an angle. A movement distance of the lens may be calculated by multiplying a unique focal length of a lens by the angle obtained, as described above.

The PID controller 208 may adjust an amount of current flowing to the VCM 210 to move the lens based on an output of the gyro integrator 206.

For example, when a control range of the VCM 210 may be represented from 0 to 1023, which are ten bits, the PID controller 208 may allow the lens to be positioned at a position spaced apart from the center leftward by 100 μm when an output value of the PID controller 208 is 0. In another example, the PID controller 208 may allow the lens to be positioned at a position spaced apart from the center rightward by 100 μm when an output value of the PID controller 208 is 1023. In another example, the PID controller 208 may allow the lens to be positioned at the center when an output value of the PID controller 208 is 512.

The VCM 210 and an actuator (not illustrated) for moving the lens module 212, may move the lens module 212 or an image sensor (not illustrated) using a principle that force is generated when current flows in a coil present in a magnetic field formed by a magnet.

A voltage of the hall sensor 214 may be changed depending on strength of the magnetic field. The hall sensor 214 may generate a voltage that is in proportion to the strength of the magnetic field depending on movement of the lens module 212 in which the magnet is mounted due to a hall effect. The hall effect is the production of voltage difference a direction perpendicular to the current and the magnetic field when the magnetic field is applied to a conductor in which the current flows. Here, since the generated voltage is weak, it may be amplified before use. The amplified voltage may be converted from an analog value into a digital value through the analog to digital converter 216.

The CPU 200 included in the optical image stabilizer may periodically perform the series of operations described above. In the example of the optical image stabilizer described above, some functional blocks of the optical image stabilizer 102 may be turned off when lens control is not performed, although optical image stabilizer 102 is being operated, thereby decreasing power consumption of the optical image stabilizer 102. Only functional blocks as small as possible may be operated when the optical image stabilizer 102 is not operated to significantly decreasing power consumption.

FIG. 3 is a diagram illustrating an example of an operation mode of the optical image stabilizer depending on a method of decreasing power consumption of an optical image stabilizer. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. The above description of FIGS. 1-2, is also applicable to FIG. 3, and is incorporated herein by reference. Thus, the above description may not be repeated here.

A ready mode M300 is a ready state in which a PID control is not performed. The ready state refers to a mode of setting several parameters required for an operation of the optical image stabilizer.

A run mode M302 refers to a mode of sensing a hand tremor or a movement of the hand through the gyro sensor 202 and correcting the hand tremor or movement through a PID control. Since all of the functional blocks required for an OIS operation are in a turned-on state, the largest amount of power may be consumed in the optical image stabilizer. However, when a user of the smartphone turns off the camera or a camera function is executed in the background in order to perform other operations, the optical image stabilizer does not need to be maintained in the run mode.

When the camera is turned off or the camera function is executed in the background during a stage in which the optical image stabilizer is in the run mode, the host 100 may transmit an optical image stabilization (OIS) turn-off command to the optical image stabilizer through the I²C interface.

When the optical image stabilizer 102 receives the OIS turn-off command from the host 100, the power managing unit 201 may switch an operation mode from the run mode M302 into a standby mode M304 to significantly decrease power consumption of the optical image stabilizer.

In the standby mode M304, the power managing unit 201 may turn-off all functional blocks other than the communications module 104, which communicates with the host 100 to decrease power consumption.

The power managing unit 201 may also lower an operation frequency required for an operation of the OIS to be sufficient for the communications module to operate, thereby significantly decreasing power consumption. In the standby mode M304, when an OIS turn-on command is received from the host 100, the power managing unit 201 may return the operation frequency to an initial state and turn on the functional blocks of the optical image stabilizer that were turned off.

An idle mode M306 refers to a mode of lowering power consumption in an idle stage, a time in which control of the optical image stabilizer is not required for a period of time.

When the OIS turn-on command is received from the host 100, the optical image stabilizer 102 may enter the run mode M302 to perform an OIS operation depending on an OIS operation control period.

When the camera (not illustrated) is turned off or the camera function is executed in the background when the optical image stabilizer 102 is in the run mode M302, such that the OIS turn-off command is received from the host 100, the power managing unit 201 may switch the optical image stabilizer 102 from the run mode M302 into the standby mode M304. The standby mode M304 significantly decreases power consumed in the optical image stabilizer 102.

An operation in which the optical image stabilizer 102 enters the standby mode M304 and subsequent operations will be described in detail with reference to FIGS. 2 through 4.

Figure 4:
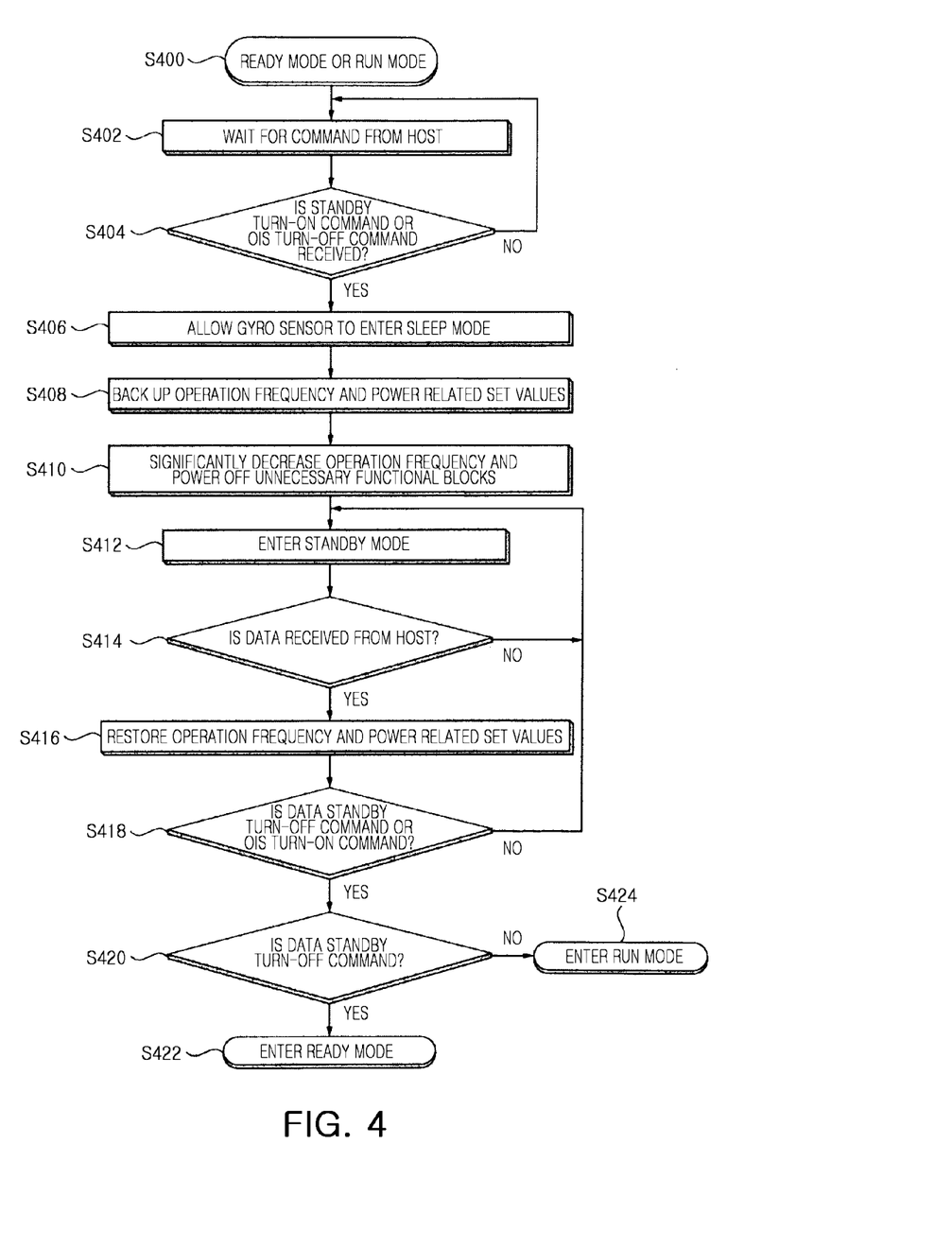
FIG. 4 is a diagram illustrating an example of a standby mode depending on the method of decreasing power consumption of an optical image stabilizer.

FIG. 4 is a diagram illustrating an example of a standby mode depending on the method of decreasing power consumption of an optical image stabilizer. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. The above description of FIGS. 1-3, is also applicable to FIG. 4, and is incorporated herein by reference. Thus, the above description may not be repeated here.

In S400, it may be assumed that the optical image stabilizer 102 is in the ready mode M300 or the run mode M302.

In S402, the power managing unit 201 may wait for a command from the host 100. In S404, the power managing unit 201 may decide whether or not a standby turn-on command or the OIS turn-off command is received from the host 100.

When standby turn-on command or OIS turn-off command is received from the host 100, the power managing unit 201 may turn off a sensing function of the gyro sensor 202 and turn on a communications function in the gyro sensor 202 to set a mode of the gyro sensor 202 to a sleep mode, in S406.

In S408, the power managing unit 201 may back up an operation frequency and power related set values of a current state that are to be used when the optical image stabilizer 102 enters the ready mode M300 or later enters the run mode M302.

In S410, the power managing unit 201 may decrease the operation frequency to be sufficient for the communications module 104 to be operated and stop operation of other functional blocks, thereby significantly decreasing the power consumed in the optical image stabilizer 102.

In S412, the optical image stabilizer 102 may enter the standby mode M304.

In S414, the communications module 104 included in the optical image stabilizer 102 may decide whether data is received from the host 100.

When the host 100 transmits the data through the I²C interface in the standby mode M304, an I²C interrupt may be generated in the communications module 104.

In S416, when the data is received from the host 100, the power managing unit 201 may restore the backed-up operation frequency and power related set values in order to again increase an execution speed of the optical image stabilizer, depending on the interrupt generated in the communications module 104.

In S418, the power managing unit 201 may decide whether the data received from the host 100 is the standby turn-off command or the OIS turn-on command.

In S420, the power managing unit 201 may decide whether the data received from the host 100 is the standby turn-off command.

In S422, when the data received from the host 100 is the standby turn-off command, the power managing unit 201 may allow the optical image stabilizer 102 to enter the ready mode M300.

In S424, when the data received from the host 100 is not the standby turn-off command, but is the OIS turn-on command, the power managing unit 201 may allow the optical image stabilizer 102 to enter the run mode M302.

In S418, when the data received from the host 100 is not the standby turn-off command or the OIS turn-on command, the method of decreasing power consumption of an optical image stabilizer may proceed to S412, and thus the optical image stabilizer 102 may be continuously maintained in the standby mode M304.

Figure 5:
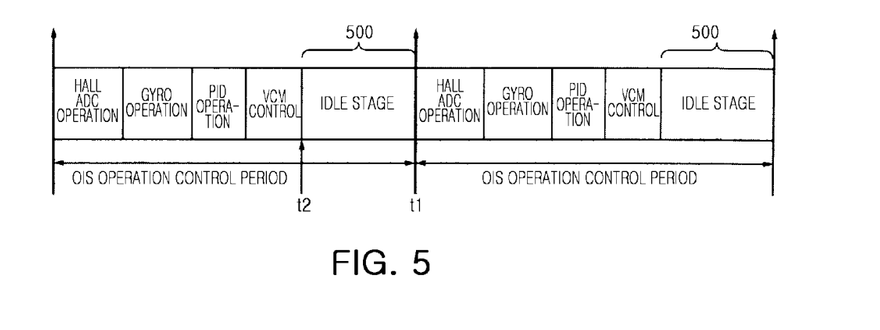
FIG. 5 is a diagram illustrating an example of an operation period of the optical image stabilizer in a run mode.

FIG. 5 is a diagram illustrating an example of an operation period of the optical image stabilizer in a run mode.

Figure 7:
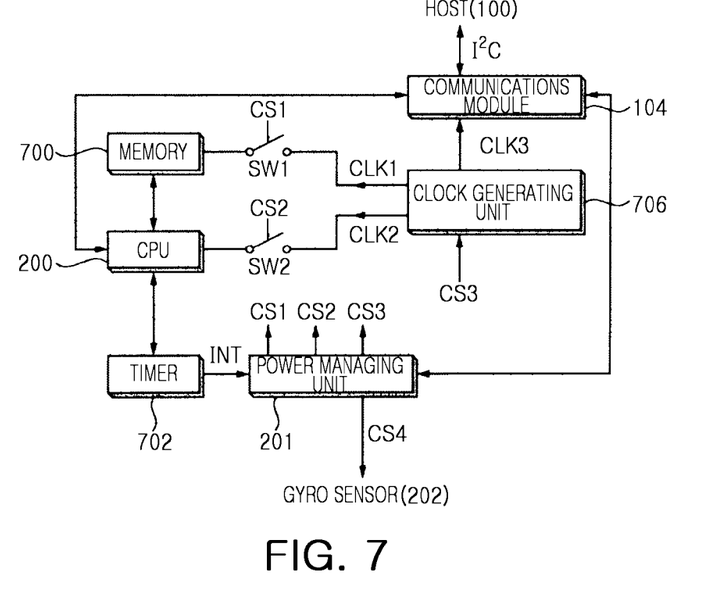
FIG. 7 is a diagram illustrating an example of operations in the standby mode and the idle mode in the optical image stabilizer.

Referring to FIG. 5, the CPU 200 included in the optical image stabilizer 102 may perform the OIS at a predetermined OIS operation control period set by a timer 702 (see FIG. 7).

As illustrated in FIG. 5, the OIS operation control period may include a stage in which an output signal of the hall sensor 214 is converted into digital data, a gyro data calculating stage, a PID data calculating stage, a VCM control stage, and an idle stage.

Referring to FIG. 5, the idle stage 500, may be a time period in which OIS control is not performed, may be present during the OIS operation control period.

Since the OIS control is not performed in the idle stage 500, when all of the functional blocks are maintained in a turned-on state, power may be continuously consumed.

Therefore, in the optical image stabilizer and the method disclosed herein, some of the functional blocks may be turned off without having an influence on an operation and performance of the OIS during the idle stage 500, thereby significantly decreasing power consumption.

An operation state of decreasing power consumption by turning off some of the functional blocks during the idle stage 500 as described above refers to the idle mode M306.

In the idle mode M306, the power managing unit 201 may stop the supply of clocks to the CPU 200 and a memory 700 (see FIG. 7), and thus operations of the CPU 200 and the memory 700 may be stopped, but other peripheral devices may still be operated.

In the idle mode M306, the CPU 200 may be in a stopped state, but the timer 702 determining the OIS operation control period may be in state in which it is being operated. Therefore, when the power managing unit 201 restarts the supply of clocks to the CPU 200 and the memory 700 depending on an interrupt signal generated by the timer 702 at a point in time t1 at which the next OIS operation control period starts, the optical image stabilizer 102 may again return from the idle mode M306 to the run mode.

For instance, the optical image stabilizer 102 may enter the idle mode M306 at a point in time t2 at which a VCM control ends, and return from the idle mode M306 to the run mode M302 by the interrupt signal generated by the timer 702 at the point in time t1 at which the next OIS operation control period starts.

Through the above-mentioned repeated operation, the power managing unit 201 may stop the supply of the clocks to the CPU 200 and the memory 700 during the idle stage 500 to stop the operations of the CPU 200 and the memory 700, thereby allowing the optical image stabilizer 102 to enter the idle mode M306 to significantly decrease power consumed in the optical image stabilizer 102. The idle mode M306 will be described in detail with reference to FIGS. 6 and 7. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. The above description of FIGS. 1-5, is also applicable to FIG. 6, and is incorporated herein by reference. Thus, the above description may not be repeated here.

Figure 6:
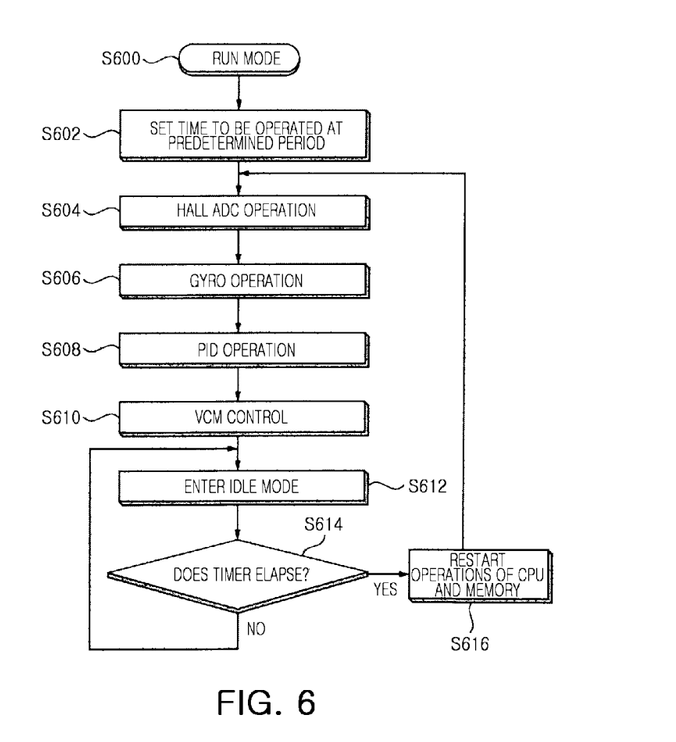
FIG. 6 is a diagram illustrating an example of an idle mode depending on the method of decreasing power consumption of an optical image stabilizer.

When the optical image stabilizer 102 receives the OIS turn-on command from the host 100 in the ready mode M300 and the standby mode M304, the optical image stabilizer 102 may enter the run mode M302, in S600.

When the optical image stabilizer 102 enters the run mode M302, in S602, the optical image stabilizer 102 may set a operation period in the timer 702 in order to be operated at a period of time.

In S604, an analog to digital conversion (ADC) operation may be performed on the output signal of the hall sensor 214 representing a current position of the lens module 212. In S606, a gyro operation may be performed on movement of the camera obtained from the gyro sensor 202.

In S608, a PID operation may be performed based on a hall ADC value and a value obtained from the gyro sensor 202. In S610, a VCM control may be performed in order to perform OIS based on a result of the PID operation, thereby moving the lens module 212.

In S608, the power managing unit 201 may stop the supply of the clocks to the CPU 200 and the memory 700 at the point in time t2 at which the VCM control ends to stop the operations of the CPU 200 and the memory 700, thereby allowing the optical image stabilizer 102 to enter the idle mode M306 to significantly decrease power consumed in the optical image stabilizer 102.

Referring to FIG. 7, the power managing unit 201 may manage power of respective components included in the optical image stabilizer 102. The power managing unit 201 may control operations of switches SW1 and SW2, to allow clocks CLK1 and CLK2 generated in a clock generating unit 706 to be supplied or not to be supplied to the CPU 200 and the memory 700.

The power managing unit 201 may apply a control signal CS3 to the clock generating unit 706 in the standby mode M304 to significantly decrease an operation frequency of a clock CLK3 output from the clock generating unit 706 to be enough for only the communications module 104 to be operated. The power managing unit 201 may apply a control signal CS4 to the gyro sensor 202 to turn off the sensing function of the gyro sensor 202 and turn on the communications function in the gyro sensor 202, thereby allowing the gyro sensor 202 to enter the sleep mode.

In S614, it may be determined whether a time set in the timer 702 has elapsed. When the time set in the timer 702 elapses, the timer 702 may generate an interrupt signal INT. In S616, when the interrupt signal INT is received from the timer 702, the power managing unit 201 may supply the clocks CLK1 and CLK2 to the CPU 200 and the memory 700 to restart operations of the CPU 200 and the memory 700.

If it is determined in S614 that the time set in the timer 702 has not elapsed, the method of decreasing power consumption of an optical image stabilizer may proceed to S612, and thus the optical image stabilizer 102 may be continuously maintained in the idle mode M306.

As set forth above, some of the functional blocks of the optical image stabilizer, such as the CPU, the memory, and the like, may be turned off in the case in which the lens control is not performed even though the optical image stabilizer is being operated, thereby decreasing power consumption, and only the communications module, which is the functional block as small as possible, may be operated when the optical image stabilizer is not operated, thereby significantly decreasing power consumed in the optical image stabilizer. Therefore, battery power consumed in the smartphone or the camera in which the optical image stabilizer is embedded may be significantly decreased.

The apparatuses, units, modules, devices, and other components illustrated that perform the operations described herein are implemented by hardware components. Examples of hardware components include controllers, sensors, generators, drivers and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array (FPGA), a programmable logic array, a microprocessor, an application-specific integrated circuit (ASIC), or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3-6 that perform the operations described herein are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical image stabilizer comprising:
   a motion sensor configured to sense a movement of a camera;
   a controller configured to move a lens module based on the movement of the camera;
   a communicator configured to communicate with a host; and
   a power manager configured to control a power supply of the optical image stabilizer and to turn on only the communicator in the standby mode,
   wherein the optical image stabilizer enters a standby mode based on an optical image stabilization (OIS) turn-off command being received from the host, in response to the camera being turned off or a camera function being executed in a background during a stage in which an OIS operation is performed, and
   wherein the power manager is further configured to back up an operation frequency and power related set values before the optical image stabilizer enters the standby mode, and to decrease the operation frequency to be sufficient for operation of the communicator.

2. The optical image stabilizer of claim 1, the power manager is further configured to restore the operation frequency and the power related set values and to allow the controller to perform the OIS operation depending on the OIS operation control period, in response to the communicator receiving an OIS turn-on command from the host when the optical image stabilizer is in the standby mode.

3. The optical image stabilizer of claim 1, wherein the optical image stabilizer is maintained in an idle mode in an OIS operation control period from a point in time when controlling of an actuator moving the lens module ends to a point in time when a next OIS operation control period starts.

4. The optical image stabilizer of claim 3, further comprising a power manager and a memory, wherein the power manager is configured to stop supply of clocks to the controller and the memory during a stage in which the optical image stabilizer is in the idle mode.

5. The optical image stabilizer of claim 4, wherein:
   the power manager is further configured to restart the supply of the clocks to the control unit and the memory in response to receiving an interrupt signal informing a start of the next OIS operation control period from a timer when the optical image stabilizer is in the idle mode,
   the OIS operation control period comprises a stage in which an output signal of a hall sensor is converted into digital data, a motion sensor data calculating stage, a proportional-integral-differential (PID) data calculating stage, an actuator control stage, and an idle stage.

6. A method of decreasing power consumption of an optical image stabilizer, the method comprising:
   running the optical image stabilizer in a run mode to perform an OIS operation depending on an OIS operation control period, in response to an OIS turn-on command being received from a host; and
   allowing the optical image stabilizer to enter a standby mode, in response to a camera being turned off or a camera function being executed in a background when the optical image stabilizer is in the run mode, and an OIS turn-off command is received from the host,
   wherein only a communications module used for communications with the host is turned on in the standby mode, and
   wherein an operation frequency and power related set values are backed up and the operation frequency is decreased to be sufficient for the operation of the communications module, before the optical image stabilizer enters the standby mode.

7. The method of claim 6, wherein the running of the optical image stabilizer in the run mode comprises restoring the operation frequency and the power related set values and performing the OIS operation depending on the OIS operation control period, in response to the communications module receiving the OIS turn-on command when the optical image stabilizer is in the standby mode.

8. The method of claim 6, wherein the running of the optical image stabilizer in the run mode comprises maintaining the optical image stabilizer in an idle mode from a point in time at which controlling of an actuator moving a lens module ends to a point in time at which a next OIS operation control period starts.

9. The method of claim 8, further comprising stopping a supply of clocks to a control unit and a memory during a stage in which the optical image stabilizer is in the idle mode.

10. The method of claim 9, further comprising restarting the supply of the clocks to the control unit and the memory, in response to an interrupt signal informing a start of the next OIS operation control period being received from a timer during the stage in which the optical image stabilizer is in the idle mode.

11. The method of claim 10, wherein the OIS operation control period comprises a stage in which an output signal of a hall sensor is converted into digital data, a motion sensor data calculating stage, a PID data calculating stage, an actuator control stage, and an idle stage.

12. The method of claim 6, further comprising:
allowing the optical image stabilizer to enter the standby mode, in response to a standby turn-on command being received from the host during a stage in which the optical image stabilizer is in a ready mode;
allowing the optical image stabilizer to enter the ready mode, in response to a standby turn-off command being received from the host during a stage in which the optical image stabilizer is in the standby mode; and
allowing the optical image stabilizer to enter the run mode, in response to the OIS turn-on command being received from the host during a stage in which the optical image stabilizer is in the ready mode.

13. An optical image stabilizer comprising:
a communication module communicating with a host;
a power manager configured to control a power supply of the optical image stabilizer and to turn on only the communications module in a standby mode;
a motion sensor configured to sense a movement of an optical lens; and
a controller configured to adjust an amount of current flowing to a motor, the motor being configured to move the optical lens based on the current;
wherein the optical image stabilizer is maintained in an idle mode during portions of an optical image stabilization (OIS) operation from a first time when the motor stops moving the optical lens to a second time when the communication module generates an interrupt signal to start another OIS operation, and
wherein the power manager is further configured to back up an operation frequency and power related set values before the optical image stabilizer enters the idle mode, and to decrease the operation frequency to be sufficient for operation of the communicator.

14. The optical image stabilizer of claim 13, wherein the communication module generates the interrupt signal, in response to receiving data from the host.

* * * * *